(12) United States Patent
Lai (10) Patent No.: US 10,666,769 B2
(45) Date of Patent: May 26, 2020

(54) NETWORK SYSTEM AND METHOD FOR ESTABLISHING DATA LINK BY USING RELAY NODE

(71) Applicants: ThroughTek Technology (ShenZhen) Co., Ltd., Shenzhen, Guangdong (CN); ThroughTek Co., Ltd., Taipei (TW)

(72) Inventor: Chung-Yu Lai, New Taipei (TW)

(73) Assignees: ThroughTek Technology (ShenZhen) Co., Ltd., Shenzhen, Guangdong (CN); ThroughTek Co., Ltd., Taipei (TW)

( * ) Notice: Subject to any disclaimer, the term of this patent is extended or adjusted under 35 U.S.C. 154(b) by 232 days.

(21) Appl. No.: 15/365,964

(22) Filed: Dec. 1, 2016

(65) Prior Publication Data
US 2017/0230484 A1  Aug. 10, 2017

(30) Foreign Application Priority Data
Feb. 5, 2016 (TW) .............................. 105104014 A (51) Int. Cl.
*H04L 29/06* (2006.01)
*H04L 29/08* (2006.01)

(52) U.S. Cl.
CPC ............ *H04L 67/42* (2013.01); *H04L 67/104* (2013.01); *H04L 67/16* (2013.01)

(58) Field of Classification Search
CPC ...................................................... H04L 67/42
See application file for complete search history.

(56) References Cited

U.S. PATENT DOCUMENTS

| | | | | |
|---|---|---|---|---|
| 9,489,761 B2* | 11/2016 | Edwards | ................. | G06T 13/00 |
| 2007/0171835 A1* | 7/2007 | Gobara | ............. | H04L 29/12509 370/248 |
| 2011/0082941 A1 | 4/2011 | Kim | | |
| 2011/0194483 A1* | 8/2011 | Ji | ....................... | H04W 36/0033 370/315 |
| 2012/0278379 A1* | 11/2012 | Hu | .......................... | H04L 45/12 709/201 |
| 2013/0262574 A1* | 10/2013 | Cohen | ................. | G06F 17/2765 709/204 |
| 2014/0317405 A1* | 10/2014 | Johnson | .............. | H04L 63/0227 713/164 |
| 2015/0032686 A1* | 1/2015 | Kuchoor | ............... | G06F 17/241 707/608 |

FOREIGN PATENT DOCUMENTS

| | | |
|---|---|---|
| CN | 102438018 A | 5/2012 |
| CN | 104104712 A | 10/2014 |
| TW | 201320804 A1 | 5/2013 |

\* cited by examiner

*Primary Examiner* — Moustafa M Meky
*Assistant Examiner* — Sm Z Islam
(74) *Attorney, Agent, or Firm* — Winston Hsu (57) ABSTRACT

A network system includes a server, a first node, a second node, and a plurality of relay nodes. The first node is linked to the server for transmitting data. The second node is linked to the server for receiving data. Each relay node of the plurality of relay nodes is linked to the server for relaying data. When the first node and the second node belong to a configuration of network address translation type 3, a relay node is selected from the plurality of relay nodes. A first data link is established between the first node and the relay node. A second data link is established between the second node and the relay node.

15 Claims, 9 Drawing Sheets

NETWORK SYSTEM AND METHOD FOR ESTABLISHING DATA LINK BY USING RELAY NODE

BACKGROUND OF THE INVENTION

1. Field of the Invention

The present invention illustrates a network system and a method for establishing data link, and more particularly, the network system for establishing data link by using relay node under a peer to peer network.

2. Description of the Prior Art

With advancement of network techniques, a real-time based data transmission and a real-time based data broadcasting mechanism can be accomplished by using a wired or a wireless network. In general, data communication by using the network follows a specific or a standard protocol of the network. Nowadays, several protocols of the network are introduced for establishing a wireless link, such as a file transfer protocol (FTP), a transmission control/internet protocol (TCP/IP), and a peer to peer (P2P) protocol. Specifically, the peer to peer protocol belongs to a node-based data exchange mechanism. The advantage of the P2P protocol is to reduce amount of nodes connected by a P2P transmission path. Thus, P2P-based transmission can reduce a rate of packet loss and a risk of information leakage.

In a conventional P2P network, when a node A establishes a P2P-based data link to a node B, the node A executes a login process to a P2P server or transmits a request of connection to the P2P server. Then, the node A provides information of unique identifier (UID) of the node B to the P2P server. By doing so, the P2P server can acquire connection or link information between the node A and the node B. Then, the P2P server transmits an internet protocol address of the node B to the node A. Thus, the node A can establish a data link to the node B for achieving P2P-based data transmission. For example, the node A can establish a data link to the node B by using a technique of P2P hole punching. After the data link is established, data transmission (i.e., for example, data packets transmission) between the node A and the node B can be performed.

However, in a standard network system, each node satisfies one of the three configurations. As known, the three configurations include a network address translation type 1 (NAT Type-1), a network address translation type 2 (NAT Type-2), and a network address translation type 3 (NAT Type-3). Specifically, the NAT Type-3 belongs to a symmetric configuration. When the node A and the node B satisfy a configuration of NAT Type-3, a P2P-based data link between the node A and the node B cannot be established directly due to restrictions of the NAT Type-3. In other words, link failure between two arbitrary nodes may be occurred in conventional P2P network.

SUMMARY OF THE INVENTION

In an embodiment of the present invention, a network system is disclosed. The network system includes a server, a first node, a second node, and a plurality of relay nodes. The first node is linked to the server for transmitting data. The second node is linked to the server for receiving the data. Each relay node of the plurality of relay nodes is linked to the server for relaying the data. When the first node and the second node belong to two nodes with a configuration of network address translation type 3, at least one relay node is selected from the plurality of relay nodes. A first data link is established between the first node and the at least one relay node. A second data link is established between the second node and the at least one relay node.

Another embodiment of the present invention discloses a method for establishing data link. The method includes a first node transmitting a link request to a server, the first node receiving a relay nodes list and link information of a second node from the server, the first node selecting at least one relay node according to the relay nodes list, the first node establishing a first data link to the at least one relay node, the first node transmitting the link information of the second node to the at least one relay node, and each relay node of the at least one relay node establishing a second data link to the second node according to the link information of the second node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
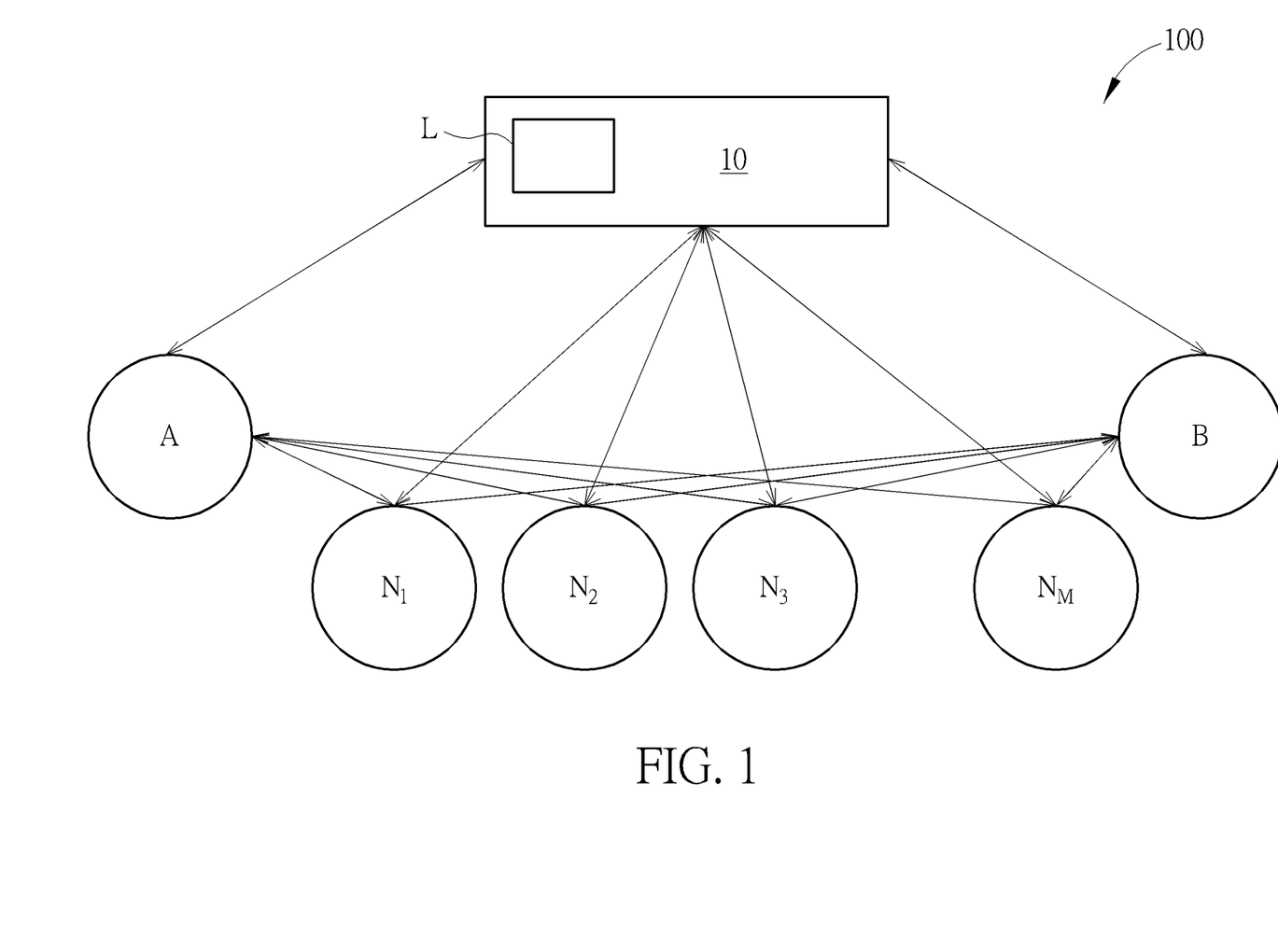
FIG. 1 illustrates a structure of a network system according to an embodiment of the present invention.

FIG. 1 illustrates a structure of a network system 100. The network system 100 includes a server 10, a first node A, a second node B and a plurality of relay nodes $N_1$ to $N_M$. M is a positive integer. The network system 100 can be considered as a peer to peer-based network system (P2P-based network system). The server 10 of the network system 100 can be any typed server, such as a cloud server, a blade server, or a work station. The first node A is linked to the server 10 for transmitting data. The second node B is linked to the server 10 for receiving the data. In the network system 100, the first node A can be any typed data transmitter, such as a terminal device capable of data transmission, a smartphone, a tablet, a personal computer, or a notebook. The second node B can be any typed data receiver, such as a terminal device capable of receiving data, a smartphone, a tablet, a personal computer, or a notebook. Each relay node of the plurality of relay nodes $N_1$ to $N_M$ is linked to the server 10 for relaying the data. Here, all nodes (i.e., including the first node A, the second node B, and the relay nodes $N_1$ to $N_M$) of the network system 100 can be devices capable of data communication, such as smartphones, tablets, personal computers, or notebooks. After each node of the network system 100 executes a login process to the server 10, the server 10 can acquire a network address translation configuration (NAT configuration) of each node. When the server 10 detects a node with an NAT configuration equal to NAT Type-1 or NAT Type-2, the server 10 saves an internet protocol address (IP address) of the node. Specifically, in P2P-based network system, when two different nodes are both detected with NAT configurations equal to NAT Type-3, a P2P-based data link cannot be established directly between two different nodes due to restrictions of the NAT Type-3. Thus, nodes with NAT Type-1 or NAT Type-2 can be considered as relay nodes for relaying the data between two different nodes with NAT Type-3. For presentation simplicity, in FIG. 1, the first node A and the second node B in the network system 100 are considered as two nodes with NAT Type-3. Thus, a P2P-based data link cannot be established directly between the first node A and the second node B. The nodes $N_1$ to $N_M$ belong to nodes with NAT Type-1 or NAT Type-2. Particularly, internet protocol addresses of the plurality of relay nodes $N_1$ to $N_M$ can be saved to the server 10. As discussed previously, each node of the plurality of relay nodes $N_1$ to $N_M$ executes the login process to the server 10. Thus, the server 10 can generate a relay nodes list L accordingly. In the embodiment, the relay nodes list L includes an internet protocol address of at least one available relay node from the plurality of relay nodes $N_1$ to $N_M$.

Although the first node A is prepared for establishing a P2P-based data link to the second node B, the P2P-based data link cannot be directly established due to a restriction of NAT Type-3. Thus, the server 10 transmits a relay nodes list L to the first node A. The first node A can receive internet protocol addresses of the relay nodes $N_1$ to $N_M$. After the internet protocol addresses of the relay nodes $N_1$ to $N_M$ are received by the first node A, the first node A starts to transmit ping packets (i.e., for example, user datagram protocol packet, UDP packet) to the relay nodes $N_1$ to $N_M$. After the ping packets are received by the relay nodes $N_1$ to $N_M$, the relay nodes $N_1$ to $N_M$ may transmit corresponding response packets back to the first node A. Then, the first node A can calculate time differences between a moment of transmitting ping packets and a moment of receiving response packets. As a result, the first node A can estimate a response time of each relay node of the relay nodes $N_1$ to $N_M$. The first node A can further perform a sort process according to M response times of the relay nodes $N_1$ to $N_M$. Finally, the first node A can select a relay node (i.e., for example, a relay node $N_3$) with a shortest response time from the relay nodes $N_1$ to $N_M$. By doing so, the selected relay node can be regarded as a relay node with best link quality and can be used for relaying data. Here, since the first node A can acquire an internet protocol address of the relay node (i.e., the relay node $N_3$) with the shortest response time from the relay nodes list L, the first node A can establish a data link to the relay node. Further, since the relay node with the shortest response time is selected, when the second node B establishes a data link to the relay node (i.e., the relay node $N_3$), data transmission can be performed between the first node A and the second node B through the relay node (i.e., the relay node $N_3$). However, a method for selecting the relay node with the shortest response time, a method for establishing the data link between the first node A and the relay node, and a method for establishing the data link between the second node B and the relay node are not limited to aforementioned techniques. For example, in other embodiments, after the first node A transmits the ping signals to the relay nodes $N_1$ to $N_M$, the first node A receives the response signals. Then, when a first response signal transmitted from a relay node is received by the first node A (i.e., a relay node with slight or non-delay), the first node A selects the relay node for relaying data. The rest of relay nodes are reserved temporarily. For presentation completeness, several operation modes for relaying data in the network system 100 are illustrated below.

Figure 2:
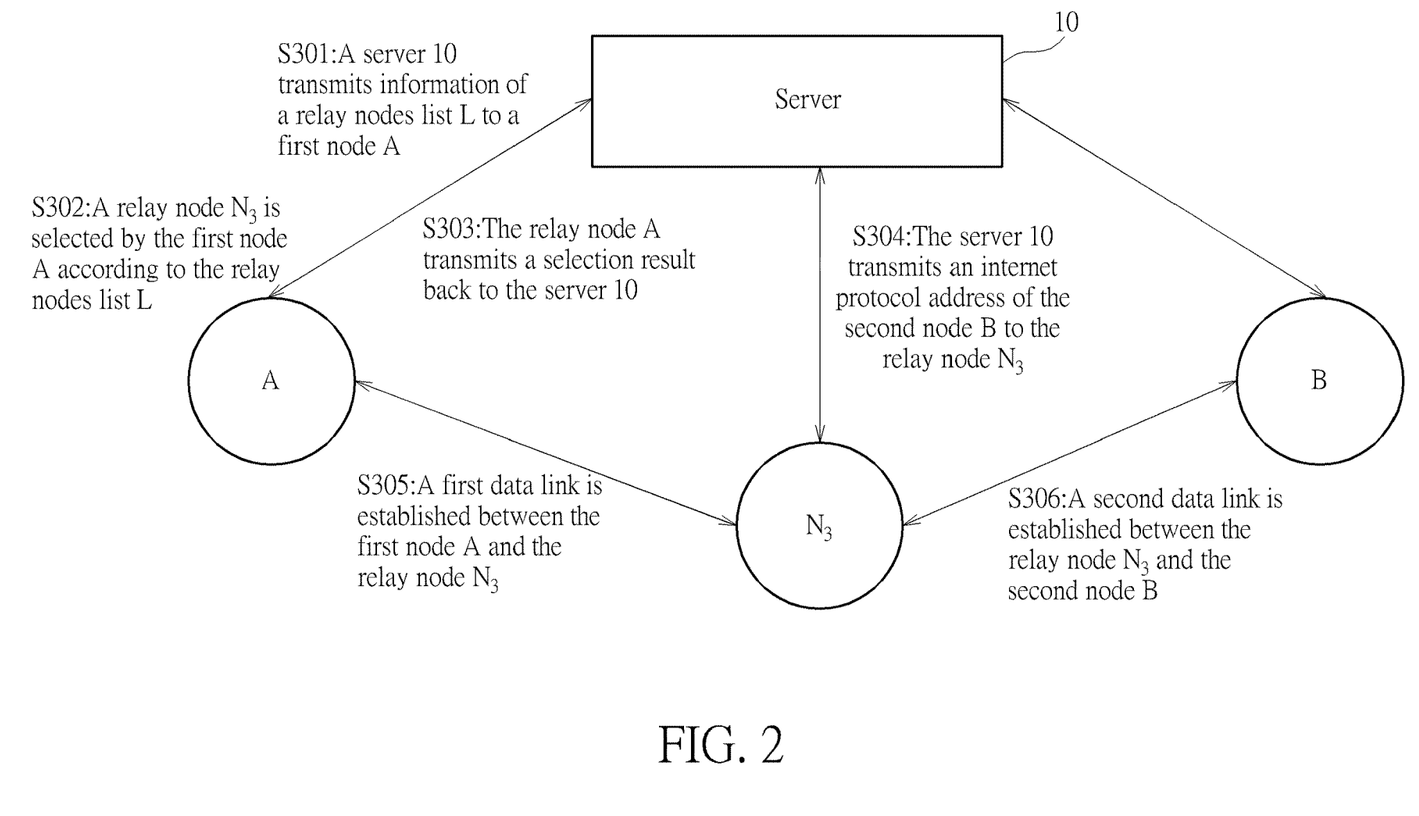
FIG. 2 illustrates a schematic diagram of a first relay mode in the network system.
Figure 3:
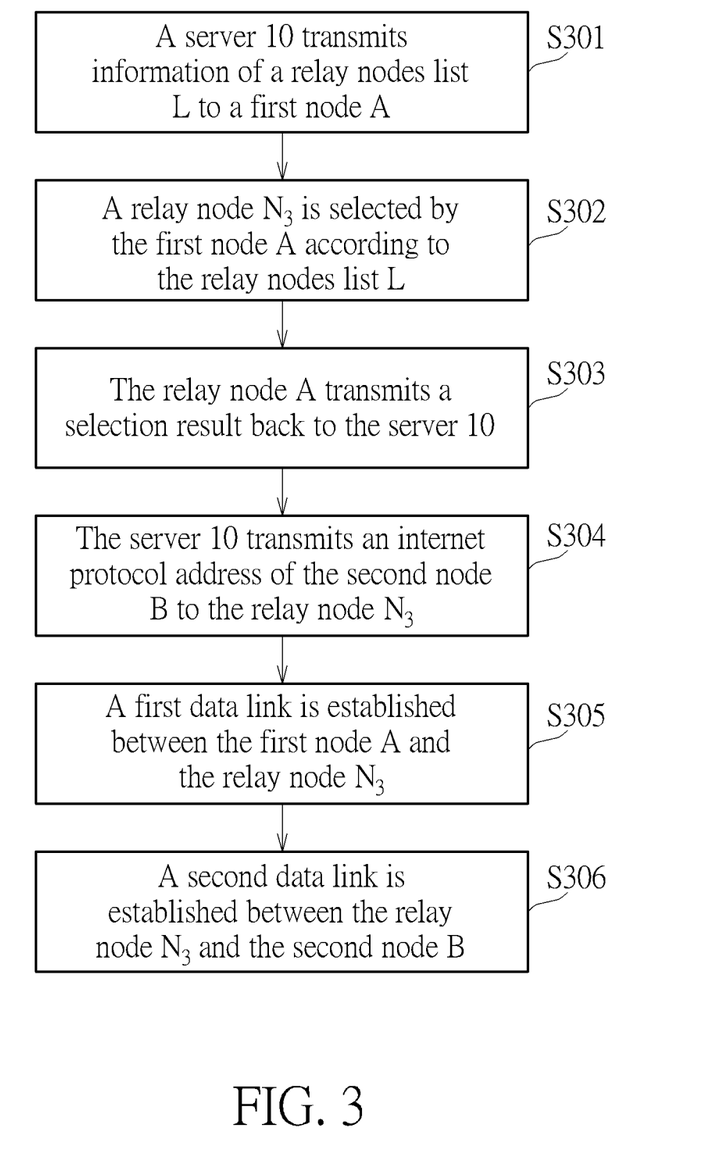
FIG. 3 illustrates a flow chart of the first relay mode in the network system.

FIG. 2 illustrates a schematic diagram of a first relay mode in the network system 100. FIG. 3 illustrates a flow chart of the first relay mode in the network system 100. The first relay mode in the network system 100 includes the following steps. Specifically, the scope of the present invention is not limited to the order of following steps. One embodiment of the first relay mode can be illustrated below.

step S301: A server 10 transmits information of a relay nodes list L to a first node A;

step S302: A relay node $N_3$ is selected by the first node A according to the relay nodes list L;

step S303: The relay node A transmits a selection result back to the server 10;

step S304: The server 10 transmits an internet protocol address of the second node B to the relay node $N_3$;

step S305: A first data link is established between the first node A and the relay node $N_3$;

step S306: A second data link is established between the relay node $N_3$ and the second node B.

The first relay mode is illustrated as below. In step S301, the server 10 transmits information of the relay nodes list L to the first node A. Specifically, the relay nodes list L includes internet protocol addresses of the relay nodes $N_1$ to $N_M$. Then, the first node A transmits ping packets to the nodes $N_1$ to $N_M$ and tries to receive response packets from the nodes $N_1$ to $N_M$. Further, in step S302, the relay node $N_3$ with a shortest response time is selected from the relay nodes $N_1$ to $N_m$. Here, in step S302, the relay node $N_3$ can also be selected as a relay node transmitted a response signal that is first received by the first node A. Then, the relay node A transmits a selection result back to the server 10 in step S303. Thus, the server 10 can acquire information of link to be established between the first node A and the relay node $N_3$. In step S304, the server 10 transmits the internet protocol address of the second node B to the relay node $N_3$. Since the first node A can acquire an internet protocol address of the relay node $N_3$ according to the relay nodes list L, the first node A can establish the first data link to the relay node $N_3$ in step S305. Similarly, since the relay node $N_3$ can acquire the internet protocol address of the second node B in step S304, the relay node $N_3$ can establish the second data link to the second node B in step S306. As a result, although the first node A and the second node B belong to two nodes with a configuration of network address translation type 3 (NAT Type-3) and thus fail to establish P2P-based data link directly, data can be transmitted from the first node A (i.e., source) to the node B (i.e., destination) through the relay node $N_3$ according to the step S301 to the step S306. In other words, data communication between the first node A and the second node B can be performed.

Figure 4:
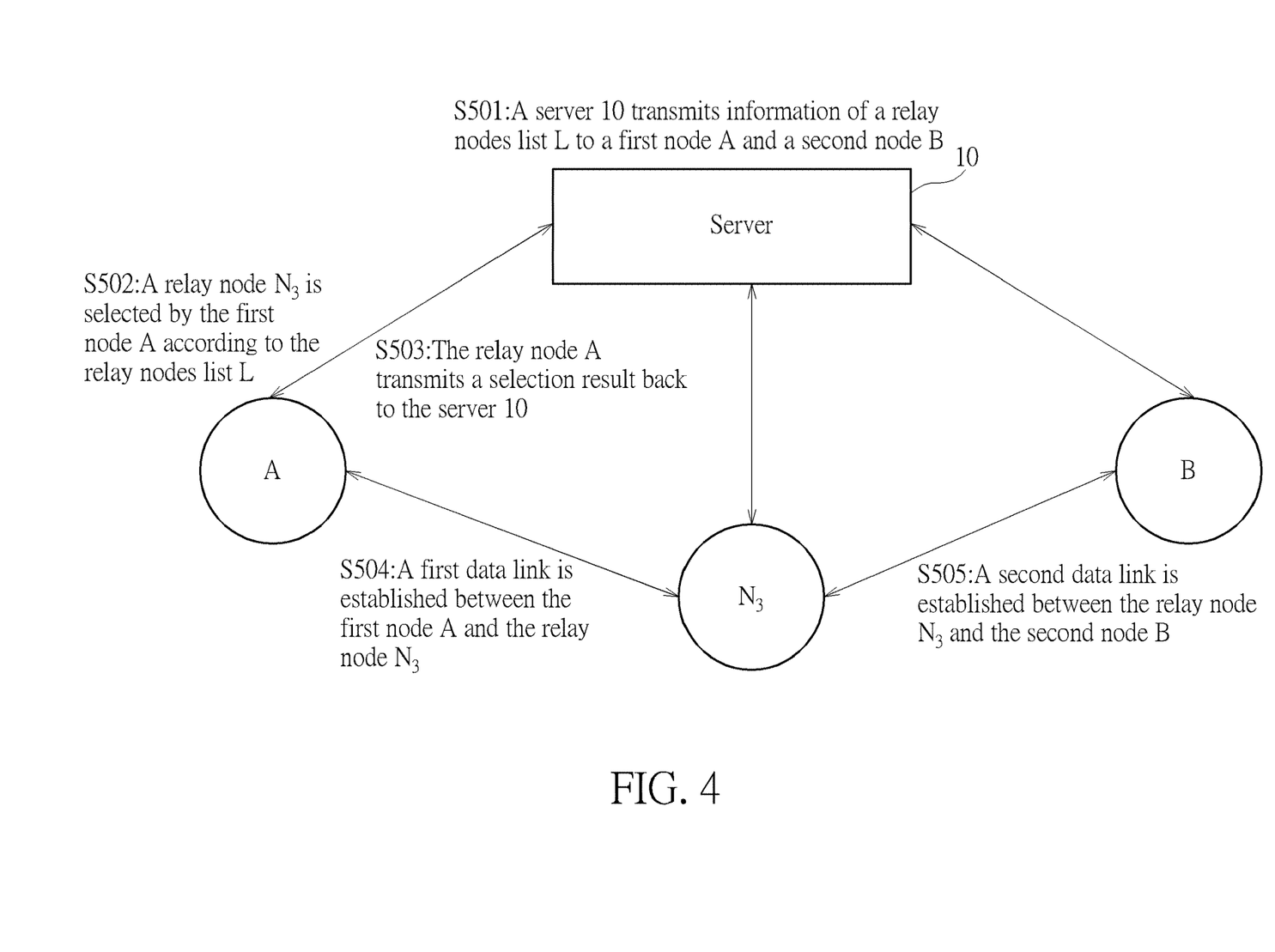
FIG. 4 illustrates a schematic diagram of a second relay mode in the network system.
Figure 5:
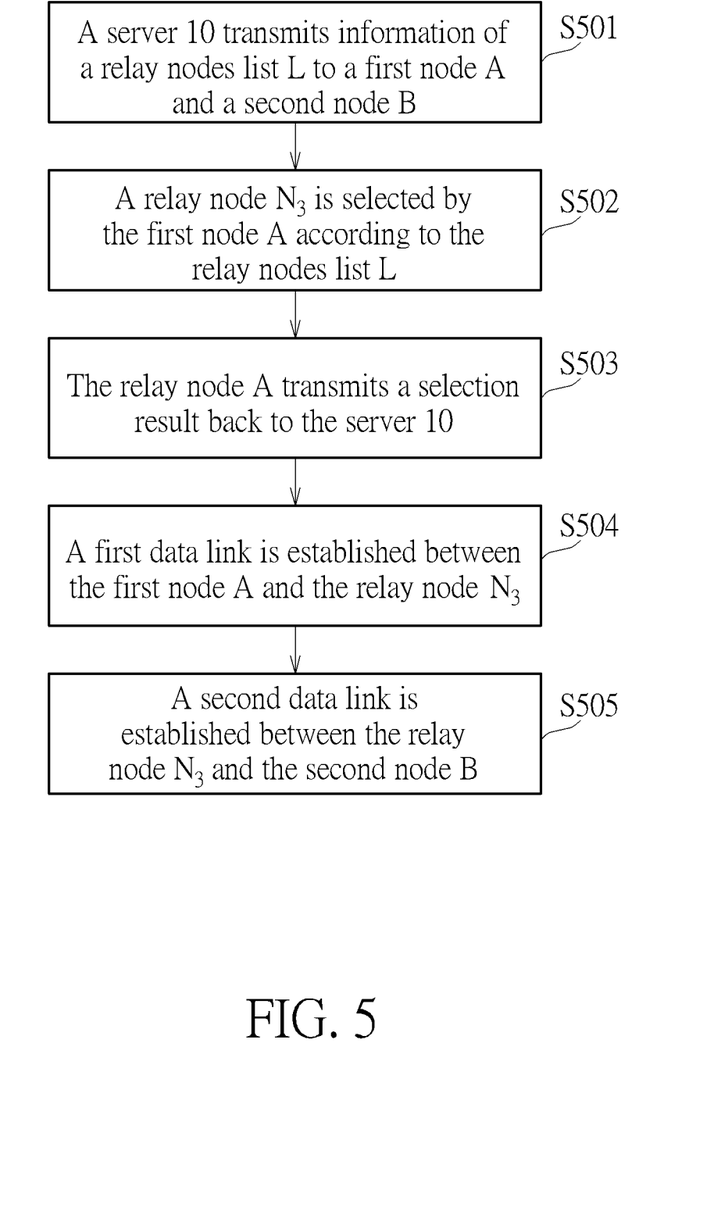
FIG. 5 illustrates a flowchart of the second relay mode in the network system.

FIG. 4 illustrates a schematic diagram of a second relay mode in the network system 100. FIG. 5 illustrates a flow chart of the second relay mode in the network system 100. The second relay mode in the network system 100 includes the following steps. Specifically, the scope of the present invention is not limited to the order of following steps. One embodiment of the second relay mode can be illustrated below.

step S501: A server 10 transmits information of a relay nodes list L to a first node A and a second node B;

step S502: A relay node $N_3$ is selected by the first node A according to the relay nodes list L;

step S503: The relay node A transmits a selection result back to the server 10;

step S504: A first data link is established between the first node A and the relay node $N_3$;

step S505: A second data link is established between the relay node $N_3$ and the second node B.

The second relay mode is illustrated as below. In step S501, the server 10 transmits information of the relay nodes list L to the first node A and the second node B simultaneously. Specifically, the relay nodes list L includes internet protocol addresses of the relay nodes $N_1$ to $N_M$. Then, the first node A transmits ping packets to the nodes $N_1$ to $N_M$ and tries to receive response packets from the nodes $N_1$ to $N_M$. Further, in step S502, the relay node $N_3$ with a shortest response time is selected from the relay nodes $N_1$ to $N_M$. Here, in step S502, the relay node $N_3$ can also be selected as a relay node that transmitted a response signal that is first received by the first node A. Then, the relay node A transmits a selection result back to the server 10 in step S503. Thus, the server 10 can acquire information of link to be established between the first node A and the relay node $N_3$. Since the first node A can acquire an internet protocol address of the relay node $N_3$ according to the relay nodes list L, the first node A can establish the first data link to the relay node $N_3$ in step S504. At the moment, the server 10 transmits a request signal to the second node B. After the second node B receives the request signal, the second node B can establish the second data link to the relay node $N_3$ in step S505 since the second node B can acquire the internet protocol address of the relay node $N_3$ according to the relay nodes list L. As a result, although the first node A and the second node B belong to two nodes with a configuration of network address translation type 3 (NAT Type-3) and thus fail to establish P2P-based data link directly, data can be transmitted from the first node A (i.e., source) to the node B (i.e., destination) through the relay node $N_3$ according to the step S501 to the step S505. In other words, data communication between the first node A and the second node B can be performed.

Figure 6:
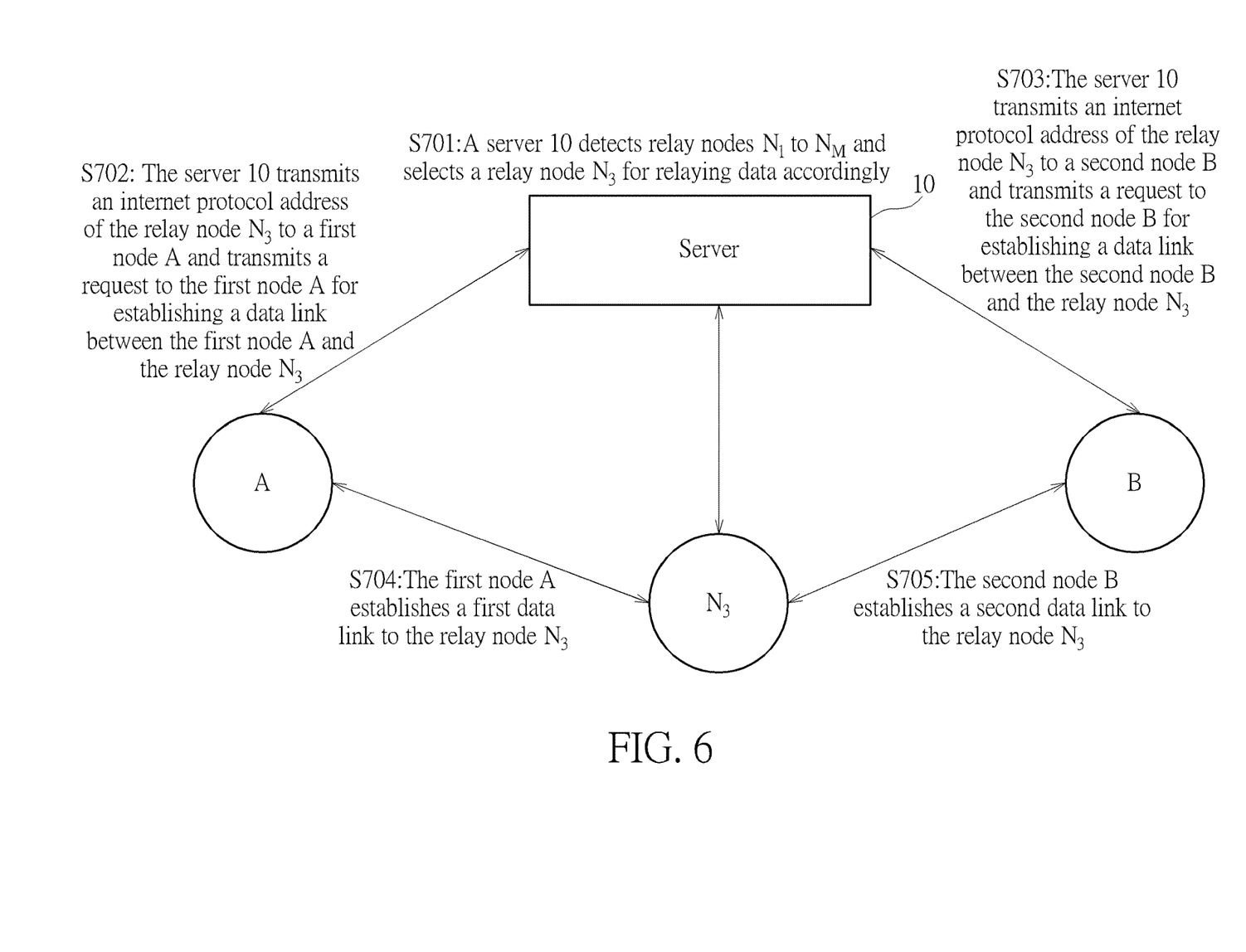
FIG. 6 illustrates a schematic diagram of a third relay mode in the network system.
Figure 7:
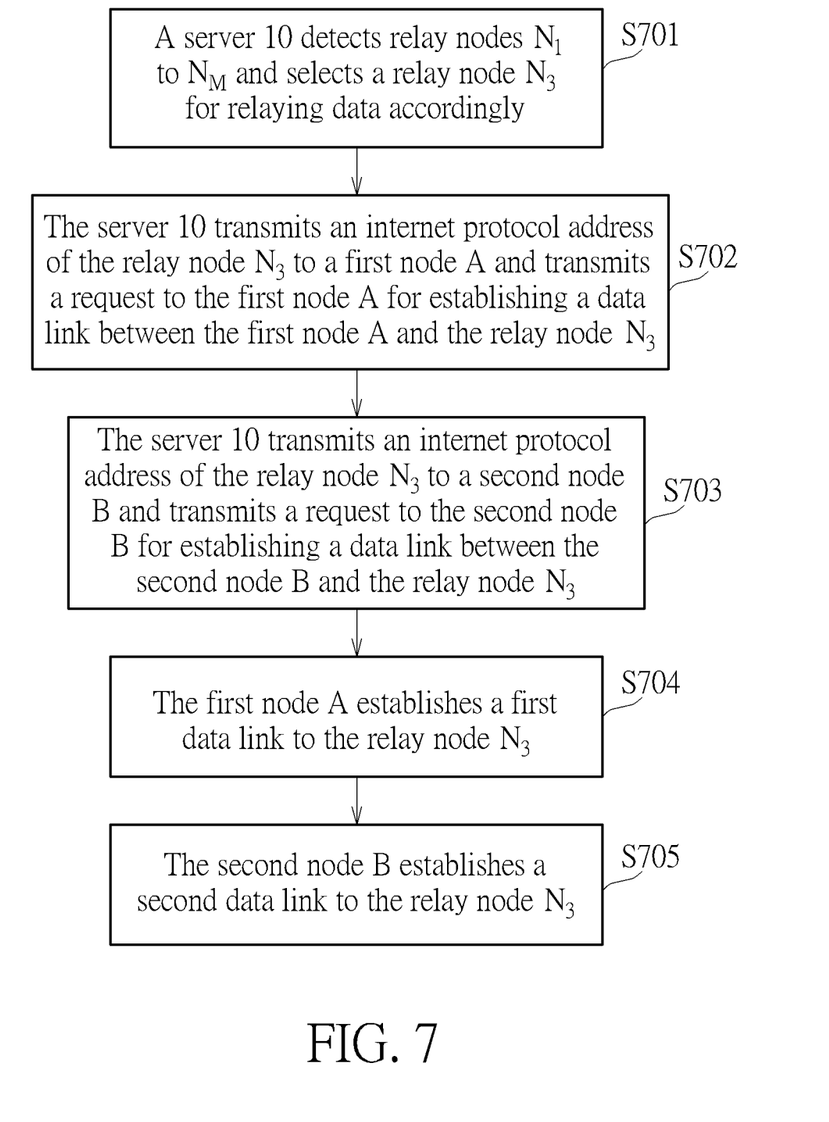
FIG. 7 illustrates a flow chart of the third relay mode in the network system.

FIG. 6 illustrates a schematic diagram of a third relay mode in the network system 100. FIG. 7 illustrates a flow chart of the third relay mode in the network system 100. The third relay mode in the network system 100 includes the following steps. Specifically, the scope of the present invention is not limited to the order of following steps. One embodiment of the third relay mode can be illustrated below.

step S701: A server 10 detects relay nodes $N_1$ to $N_M$ and selects a relay node $N_3$ for relaying data accordingly;

step S702: The server 10 transmits an internet protocol address of the relay node $N_3$ to a first node A and transmits a request to the first node A for establishing a data link between the first node A and the relay node $N_3$;

step S703: The server 10 transmits an internet protocol address of the relay node $N_3$ to a second node B and transmits a request to the second node B for establishing a data link between the second node B and the relay node $N_3$;

step S704: The first node A establishes a first data link to the relay node $N_3$;

step S705: The second node B establishes a second data link to the relay node $N_3$.

The third relay mode is illustrated as below. In step S701, the server 10 detects relay nodes $N_1$ to $N_M$ and selects a relay node $N_3$ for relaying data accordingly. Similar to aforementioned techniques, the server 10 can transmit ping packets (i.e., for example, user datagram protocol packet, UDP packet) to the relay nodes $N_1$ to $N_M$. After the ping packets are received by the relay nodes $N_1$ to $N_M$, the relay nodes $N_1$ to $N_M$ may transmit corresponding response packets back to the server 10. Then, the server 10 can calculate time differences between a moment of transmitting ping packets and a moment of receiving response packets. As a result, the server 10 can estimate a response time of each relay node of the relay nodes $N_1$ to $N_M$. The server 10 can further perform a sort process according to M response times of the relay nodes $N_1$ to $N_M$. Then, the server 10 can select a relay node $N_3$ with a shortest response time from the relay nodes $N_1$ to $N_M$. In other words, in the third relay mode, the relay node $N_3$ can be selected by the server 10. In step S702, the server 10 transmits the internet protocol address of the relay node $N_3$ to the first node A and transmits the request to the first node A for establishing a data link between the first node A and the relay node $N_3$. In step S703, the server 10 transmits the internet protocol address of the relay node $N_3$ to the second node B and transmits the request to the second node B for establishing data link between the second node B and the relay node $N_3$. After the first node A and the second node B receive the requests from the server 10, the first node A can establish the first data link to the relay node $N_3$ actively in step S704. The second node B can establish the second data link to the relay node $N_3$ actively in step S705. Specifically, the step S702 and the step S703 can be performed simultaneously for improving an efficiency of link establishment. As a result, although the first node A and the second node B belong to two nodes with a configuration of network address translation type 3 (NAT Type-3) and thus fail to establish a P2P-based data link directly, data can be transmitted from the first node A (i.e., source) to the node B (i.e., destination) through the relay node $N_3$ according to the step S701 to the step S705. In other words, data communication between the first node A and the second node B can be performed.

Figure 8:
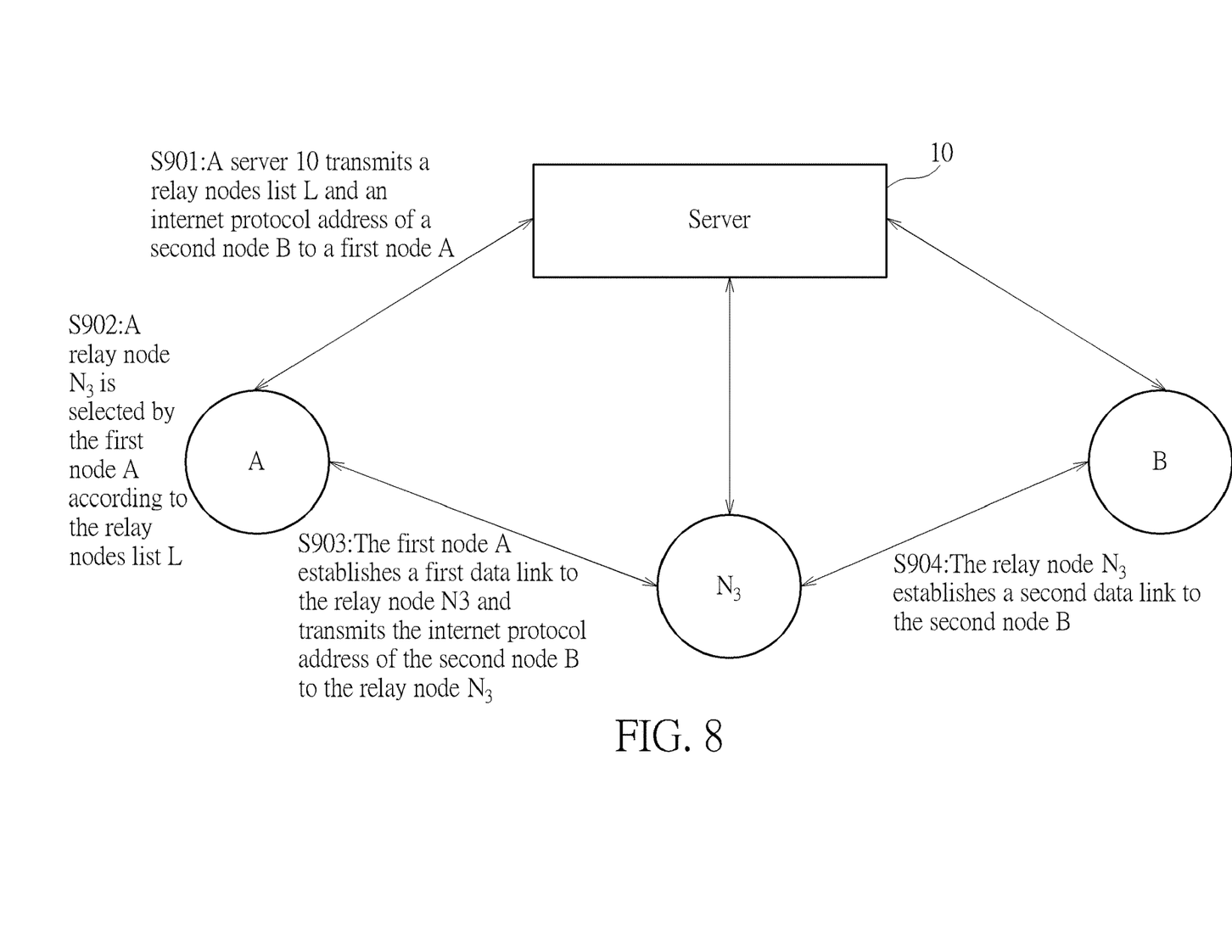
FIG. 8 illustrates a schematic diagram of a fourth relay mode in the network system.
Figure 9:
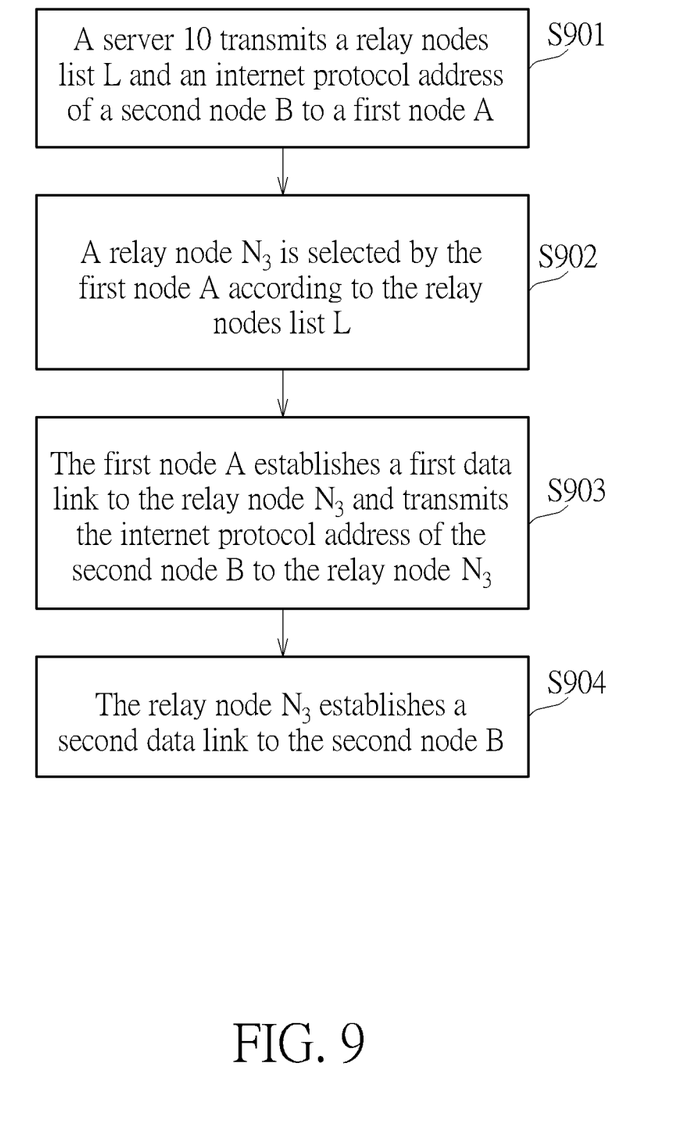
FIG. 9 illustrates a flowchart of the fourth relay mode in the network system.

FIG. 8 illustrates a schematic diagram of a fourth relay mode in the network system 100. FIG. 9 illustrates a flow chart of the fourth relay mode in the network system 100. The fourth relay mode in the network system 100 includes the following steps. Specifically, the scope of the present invention is not limited to the order of following steps. One embodiment of the fourth relay mode can be illustrated below.

step S901: A server 10 transmits a relay nodes list L and an internet protocol address of a second node B to a first node A;

step S902: A relay node $N_3$ is selected by the first node A according to the relay nodes list L;

step S903: The first node A establishes a first data link to the relay node $N_3$ and transmits the internet protocol address of the second node B to the relay node $N_3$;

step S904: The relay node $N_3$ establishes a second data link to the second node B.

The fourth relay mode is illustrated as below. In step S901, the server 10 transmits the relay node lists L and the internet protocol address of the second node B to the first node A. Specifically, the relay nodes list L includes internet protocol addresses of the relay nodes $N_1$ to $N_M$. However, the first node A can transmit a request to the sever 10 before the step S901. Then, the first node A transmits ping packets to the nodes $N_1$ to $N_M$ and tries to receive response packets from the nodes $N_1$ to $N_M$. Further, in step S902, the relay node $N_3$ with a shortest response time is selected from the relay nodes $N_1$ to $N_M$. Here, in step S902, the relay node $N_3$ can also be selected as a relay node transmitted a response signal that is first received by the first node A. Since the first node A can acquire the internet protocol address of the relay node $N_3$ according to the relay nodes list L, the first node A can establish the first data link to the relay node $N_3$ in step S903. Then, the first node A can transmit the internet protocol address of the second node B to the relay node $N_3$. After the relay node $N_3$ receives the internet protocol address of the second node B, the relay node $N_3$ can establish the second data link to the second node B in step S904. As a result, although the first node A and the second node B belong to two nodes with a configuration of network address translation type 3 (NAT Type-3) and thus fail to establish P2P-based data link directly, data can be transmitted from the first node A (i.e., source) to the node B (i.e., destination) through the relay node $N_3$ according to the step S901 to the step S904. In other words, data communication between the first node A and the second node B can be performed.

The aforementioned four relay modes are embodiments of the present invention. The scope of the present invention is not limited to above four relay modes. For example, in the third relay mode, the server 10 can directly transmit the internet protocol address of the first node A and the internet protocol address of the second node B to the relay node $N_3$ after the step S701 is operated. Then, the relay node $N_3$ can establish data links to the first node A and the second node B simultaneously. In another embodiment, instead of detecting response times of the relay nodes $N_1$ to $N_M$ by the server 10 or the first node A, a specific relay node can be directly assigned by the server 10 or the first node A. Further, a relay mechanism of the present invention can be a dynamic relay mechanism. In other words, since the relay nodes $N_1$ to $N_M$ execute a log-in process to the server 10, the server 10 can update the relay nodes list L periodically. When the network system 100 uses the dynamic relay mechanism, the server 10 can dynamically acquire internet protocol addresses of available relay nodes in current. Then, the server 10 can transmit an updated relay nodes list to the first node A. As a result, the first node A can selected an optimal relay node dynamically for relaying data according to the updated relay nodes list.

Additionally, several modifications of the relay modes in the network system 100 can be introduced. For example, the first node A can select at least one relay node for relaying data in order to improve channel capacity. A relay mode by using a plurality of relay nodes can be illustrated below. First, a server 10 transmits a relay nodes list L to a first node A. The server 10 also transmits an internet protocol address of the second node B to the first node A. Then, the first node A can estimate response times of relay nodes $N_1$ to $N_M$ by using aforementioned techniques according to the relay nodes list L. Further, the first node A selects Q relay nodes from the relay nodes $N_1$ to $N_M$ for relaying data. Here, Q and M are two positive integers greater than one and Q<M always holds. Specifically, the Q relay nodes can be selected as Q relay nodes which are transmitted Q response signals with shorter delay. Then, the first node A establishes a first data link to Q relay nodes according to Q internet protocol addresses of the Q relay nodes in the relay nodes list L. After the first data link is successfully established, the first node A can transmit the internet protocol addresses of the second node B to the Q relay nodes. Thus, each relay node of the Q relay nodes can establish a second data link to the second node B. As a result, data can be transmitted from the first node A (i.e., source) to the node B (i.e., destination) through Q relay nodes. For presentation completeness, some additional embodiments of the present invention are illustrated below.

In another embodiment of the present invention, a server 10 transmits a relay nodes list L to a first node A. The first node A establishes a first data link to the relay node $N_3$ according to an internet protocol address of the relay node $N_3$ in the relay nodes list L. Then, the first node A transmits the internet protocol address of the relay node $N_3$ to the server 10. The server 10 transmits the internet protocol address of the relay node $N_3$ to the second node B. Thus, the second node B can establish a second data link to the relay node $N_3$ according to the internet protocol address of the relay node $N_3$. As a result, data can be transmitted from the first node A (i.e., source) to the node B (i.e., destination) through the relay node $N_3$.

In another embodiment of the present invention, a server 10 transmits a relay nodes list L to a first node A and a second node B. The first node A establishes a first data link to a relay node $N_3$ according to an internet protocol address of the relay node $N_3$ in the relay nodes list L. Then, the first node A transmits identifier information of the relay node $N_3$ to the server 10 so that the server 10 is informed of a message that the relay node $N_3$ is selected for relaying data by the first node A. Then, the server 10 transmits the identifier information of the relay node $N_3$ to the second node B. Since the relay nodes list L is received by the second node B, the second node B can acquire the internet protocol address of the relay node $N_3$ from the relay nodes list L according to the identifier information of the relay node $N_3$. Thus, the second node B can establish a second data link to the relay node $N_3$ according to the internet protocol address of the relay node $N_3$. As a result, data can be transmitted from the first node A (i.e., source) to the node B (i.e., destination) through the relay node $N_3$.

In another embodiment of the present invention, a server 10 can transmit an internet protocol address of a first node A and/or an internet protocol address of a second node B to a relay node $N_3$. Thus, the relay node $N_3$ can establish a first data link to the first node A according to the internet protocol address of the first node A and/or can establish a second data link to the second node B according to the internet protocol address of the second node B. For example, the relay node $N_3$ can establish data links to the first node A and the second node B simultaneously. Also, the relay node $N_3$ can establish the second data link to the second node B after the first link is established between the relay node $N_3$ and first node A (i.e., a time slot for establishing the first link and a time slot for establishing the second link can be different). As a result, data can be transmitted from the first node A (i.e., source) to the node B (i.e., destination) through the relay node $N_3$.

As aforementioned relay modes, since the server 10 is linked to all nodes of the network system 100, the server 10 can acquire network address translation (NAT) configuration of each node. When the first node A and the second node B is detected as two nodes with a configuration of network address translation type 3 (NAT Type-3), the server 10 is informed that a P2P-based data link between the first node A and the second node B cannot be established directly. Thus, a data relay node can be applied to the network system 100. Specifically, the data relay node can be applied to the network system 100 after the establishment of the P2P-based data link between the first node A and the second node B is failed. Here, since the first node A tries to establish the P2P-based data link to the second node B initially, the first node A and/or the first node B has to acquire an internet protocol address of the destination node. In other words, when the establishment of the P2P-based data link between the first node A and the second node B is failed, since the first node A previously acquires the internet protocol address of the second node B, the server 10 can only transmit the relay node list L to the first node A in step S901. Hereafter, in step S903, the first node A can transmits the internet protocol address of the second node B (i.e., previously saved in the first node A) to the relay node N₃.

Further, although data link between two nodes can be established according to an internet protocol address, the present invention is not limited to use the internet protocol address for establishing data link. In other words, any technique of data link establishment falls into a scope of the present invention. For example, data link can be established according to link information, such as information of point-to-point protocol over Ethernet (PPPoE), information of local area network (LAN), and/or information of Ethernet Mac address.

To sum up, the present invention discloses a network system for establishing data link by using at least one relay node under P2P network. In the network system, when a data source node and a data destination node belong to two nodes with a configuration of network address translation type 3 (NAT Type-3), data communication between two nodes can be performed by using an appropriate relay node. Thus, the present invention breaks limitations or connected restrictions of traditional P2P-based network system. In other words, by using a relay node, reliability of data communication can be maintained. Data penetration of P2P network can be improved. Additionally, since no retry process is introduced when the establishment of the direct P2P-based data link is failed, utilization of a server and nodes of the network system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network system, comprising:
   a server;
   a first node linked to the server and configured to transmit data;
   a second node linked to the server and configured to receive the data; and
   a plurality of relay nodes, each relay node of the plurality of relay nodes linked to the server and configured to relay the data;
   wherein when the first node and the second node belong to two nodes with a configuration of network address translation type 3 (NAT Type-3), the first node transmits ping packets to the plurality of relay nodes and receives response packets from the plurality of relay nodes for selecting a relay node from the plurality of relay nodes by minimizing a response time between the first node and the relay node, a first data link is established between the first node and the relay node, a second data link is established between the second node and the relay node, the server detects a presence of the relay node, and controls a plurality of other relay nodes for dynamically establishing other data links connected to the first node and the second node when the relay node is absent; and
   wherein the plurality of relay nodes periodically execute a log-in process to the server, the server comprises a relay nodes list, and the server periodically updates the relay nodes list for dynamically acquire currently available relay nodes according to the log-in process of the plurality of relay nodes.

2. The network system of claim 1, wherein the server transmits information of the relay nodes list to the first node.

3. The network system of claim 2, wherein the relay nodes list comprises an internet protocol address of at least one available relay node from the plurality of relay nodes.

4. The network system of claim 1, wherein the first node transmits an internet protocol address of the second node to the relay node after the server transmits the internet protocol address of the second node to the first node and the first data link is established between the first node and the relay node, and the relay node establishes the second data link to the second node according to the internet protocol address of the second node.

5. The network system of claim 1, wherein the first node transmits an internet protocol address of the relay node to the server after the first data link is established between the first node and the relay node, the server transmits the internet protocol address of the relay node to the second node, and the second node establishes the second data link to the relay node according to the internet protocol address of the relay node.

6. The network system of claim 1, wherein the server comprises an internet protocol address of the second node, and the server transmits the internet protocol address of the second node to the relay node so that the second data link is established between the second node and the relay node.

7. The network system of claim 1, wherein the server comprises a relay nodes list, and the server transmits information of the relay nodes list to the first node and the second node.

8. The network system of claim 7, wherein the relay nodes list comprises an internet protocol address of at least one available relay node from the plurality of relay nodes.

9. The network system of claim 8, wherein the first node establishes the first data link to the relay node according to an internet protocol address of the relay node, and the second node establishes the second data link to the relay node according to the internet protocol address of the relay node.

10. The network system of claim 8, wherein the first node transmits identifier information of the relay node to the server after the first data link is established between the first node and the relay node, the server transmits the identifier information of the relay node to the second node, and the second node establishes the second data link to the relay node according to the identifier information of the relay node.

11. The network system of claim 1, wherein the server transmits an internet protocol address of the relay node to the first node and the second node.

12. The network system of claim 1, wherein the server transmits an internet protocol address of the first node and/or an internet protocol address of the second node to the relay node for establishing the first data link between the relay node and the first node and/or establishing the second data link between the relay node and the second node.

13. A method for establishing data link, comprising:
   a first node transmitting a link request to a server;
   the first node receiving a relay nodes list and link information of a second node from the server;
   the first node transmitting ping packets to a plurality of relay nodes and receiving response packets from the plurality of relay nodes for selecting a relay node from the plurality of relay nodes by minimizing a response time between the first node and the relay node according to the relay nodes list;

the first node establishing a first data link to the relay node;

the first node transmitting the link information of the second node to the relay node;

the relay node establishing a second data link to the second node according to the link information of the second node;

the server detecting a presence of the relay node;

the server controlling a plurality of other relay nodes for dynamically establishing other data links connected to the first node and the second node when the relay node is absent;

the plurality of relay nodes periodically executing a log-in process to the server; and the server periodically updating the relay nodes list for dynamically acquiring currently available relay nodes according to the log-in process of the plurality of relay nodes.

14. The method of claim 13, wherein the link information of the second node is an internet protocol address of the second node.

15. The method of claim 13, wherein the first node and the second node belong to two nodes with a configuration of network address translation type 3 (NAT Type-3).

* * * * *